US012373724B1

(12) United States Patent
Fowler et al.

(10) Patent No.: US 12,373,724 B1
(45) Date of Patent: Jul. 29, 2025

(54) LOW LATENCY SCALABLE PARALLEL STREAMING MATCHING FOR QUANTUM COMPUTING SYSTEMS

(71) Applicant: Google LLC, Mountain View, CA (US)

(72) Inventors: Austin Fowler, Los Angeles, CA (US); Jonathan Gross, Venice, CA (US)

(73) Assignee: GOOGLE LLC, Mountain View, CA (US)

( * ) Notice: Subject to any disclaimer, the term of this patent is extended or adjusted under 35 U.S.C. 154(b) by 92 days.

(21) Appl. No.: 18/082,145

(22) Filed: Dec. 15, 2022

Related U.S. Application Data

(60) Provisional application No. 63/295,545, filed on Dec. 31, 2021.

(51) Int. Cl.
*G06N 10/70* (2022.01)
*G06N 10/00* (2022.01)

(52) U.S. Cl.
CPC ............. *G06N 10/70* (2022.01); *G06N 10/00* (2019.01)

(58) Field of Classification Search
CPC ............................. G06N 10/70; G06N 10/00
See application file for complete search history.

(56) References Cited

U.S. PATENT DOCUMENTS

| | | | | |
|---|---|---|---|---|
| 11,449,385 | B2* | 9/2022 | Fowler | G06F 11/1044 |
| 11,948,045 | B2* | 4/2024 | Kelly | H10N 60/805 |
| 12,026,589 | B1* | 7/2024 | Fowler | G06N 10/00 |
| 2022/0374378 | A1* | 11/2022 | Sivan | G06F 13/4022 |

OTHER PUBLICATIONS

Arute et al., "Supplementary Information for Quantum Supremacy Using a Programmable Superconducting Processor", arXiv:1910.11333v2, Dec. 28, 2019, 67 pages.
Edmonds, "Paths, Trees and Flowers" Canadian Journal of Mathematics, Chapter 17, 1965, pp. 449-467.
Edmonds, "Maximum Matching and a Polyhedron With O,1-Vertices", Journal of Research of the National Bureau of Standards-B. Mathematics and Mathematical Physics vol. 69B, Nos. 1 and 2, Jan.-Jun. 1965, pp. 125-130.
Fowler et al., "Towards Practical Classical Processing for the Surface Code: Timing Analysis", arXiv:1202.5602v2, Oct. 15, 2012, 13 pages.
Fowler, "Minimum Weight Perfect Matching of Fault-Tolerant Topological Quantum Error Correction in Average O (1) Parallel Time", arXiv:1307.1740v3, Oct. 10, 2014, 8 pages.
Paler et al., "Pipelined Correlated Minimum Weight Perfect Matching of the Surface Code", arXiv:2205.09828v1, May 19, 2022, 6 pages.

* cited by examiner

*Primary Examiner* — Justin R Knapp
(74) *Attorney, Agent, or Firm* — DORITY & MANNING, P.A.

(57) ABSTRACT

Systems and methods for tracking errors in a quantum computing system are provided. In one example, a method can include matching data associated with one or more detection events associated with a quantum computing system using a successive pattern structure comprising a plurality of processing layers. Each processing layer in the plurality of processing layers can be associated with a pattern including a plurality of sections. Each section can be associated with a processing unit operable to match one or more detection events near a center of the section. The method can include tracking one or more errors of a quantum computing system based at least in part on a matching of one or more detection events.

20 Claims, 9 Drawing Sheets

LOW LATENCY SCALABLE PARALLEL STREAMING MATCHING FOR QUANTUM COMPUTING SYSTEMS

PRIORITY CLAIM

The present application claims the benefit of priority of U.S. Provisional Application Ser. No. 63/295,545, titled "Low Latency Scalable Parallel Streaming Matching for Quantum Computing Systems," filed on Dec. 31, 2021, which is incorporated herein by reference.

FIELD

The present disclosure relates generally to low latency scalable parallel streaming matching for quantum computing systems.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology the superposition of a "0" and "1" state in a quantum system may be represented, e.g., as $\alpha|0\rangle + \beta|1\rangle$. The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example embodiment of the present disclosure is directed to a method for tracking one or more errors in a quantum computing system. The method can include, providing, by a computing system having one or more computing devices, output of a plurality of qubits to a plurality of processing units. The plurality of qubits can be sectioned into a first plurality of sections. Each of the plurality of processing units can be associated with one of the first plurality of sections. The first plurality of sections can be associated with a first pattern. The method can include matching, by the computing system, one or more detection events near a center of the first plurality of sections. The method can include providing, by a computing system, output of a plurality of qubits to the plurality of processing units. The plurality of qubits can be sectioned into a second plurality of sections. Each of the plurality of processing units can be associated with one of the second plurality of sections. The second plurality of sections can be associated with a second pattern. The method can include matching, by the computing system, one or more detection events near a center of the second plurality of sections.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
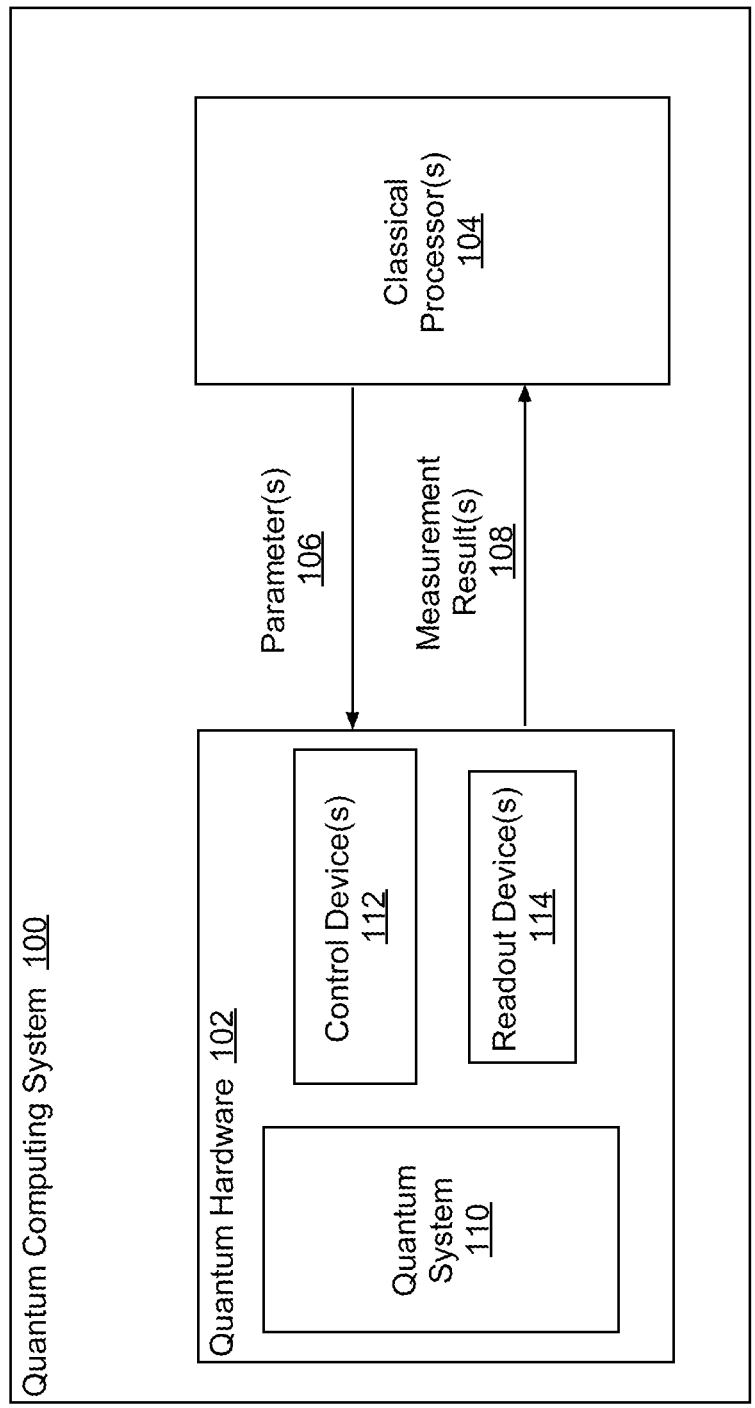
FIG. 1 depicts an example embodiment of a quantum computing system according to example aspects of the present disclosure.

Example aspects of the present disclosure are directed to systems, devices, and computer-implemented methods for error detection in quantum computing systems. More particularly, example aspects are directed to building a detection graph using a plurality of processing layers for a quantum error correction process. For example, a quantum error correction process may include reducing the error rate of logical qubits of a quantum computing system by detecting and tracking physical errors within the system. Uncorrected physical errors can generate errors in the logical qubit, but the quantum computing system may be configured to permit identification and tracking of the physical errors. In this way, operations can be implemented (e.g., at a classical processing level) to mitigate effects of such physical errors and lead to improved performance of a quantum computing system.

For instance, in some embodiments, each logical qubit may be encoded in a plurality of physical qubits. For instance, a code (e.g., a topological code, such as a surface code) may encode a logical qubit using a plurality of data qubits and measurement qubits. The measurement qubits may be configured such that their respective states can be measured to detect physical errors (e.g., errors of the physical qubits and/or of their measurement). These error detection measurements may be combined to build a weighted detection graph, with the weights of the graph links corresponding to an associated error probability.

Prior techniques for leveraging error correlations have often proved to be computationally expensive. For example, some prior techniques required processing all error detection measurements to determine a first set of results, adjusting the probabilities of certain error detection measurements according to known correlations among the first set of results, and then re-processing all error detection measurements with the adjusted probabilities. For real-time tracking of quantum errors, intervals between subsequent error detection measurements are generally on the scale of microseconds, and the iterative global processing of the entire set of error detection measurements can result in substantial computational overhead.

Advantageously, systems and methods according to example aspects of the present disclosure can provide for parallelized processing of correlated errors with reduced latency. For example, systems and methods according to example aspects of the present disclosure can offer improved performance for scalable deployment in real-world, noisy quantum computing systems with increasing numbers of qubits.

For example, in some embodiments, a quantum computing system can include a number of qubits subdivided into qubit subsets. Each of the qubit subsets can include data qubits and measurement qubits to collectively encode one or more logical qubits. Error detection measurements corresponding to each qubit subset can be stored in a local detection graph associated with that qubit subset. The local detection graph can be representative of detection events recorded in one or more rounds of error detection measurements. The detection events can, for instance, correspond to one or more measurements with odd parity produced by measurement qubit(s). Based at least in part on the physical configuration of the respective qubit subset, different patterns of detection events (e.g., spatial patterns and/or temporal patterns) can correspond to different physical errors.

In some embodiments, recognizing the likely patterns within the detection graph can include matching detection events within the detection graph by sectioning the output of the qubit grid according to one or more patterns. Thus, according to example aspects of the present disclosure, a qubit grid can be divided into multiple layers of overlapping sections to efficiently match one or more detection events near the center of these sections. A detection event can be matched with other detection events and/or a boundary. A final processing layer can handle potentially arbitrary spacetime blocks of data to match any remaining unmatched information after processing by the multiple layers of overlapping sections. In some embodiments, this final processing layer can be used relatively infrequently as it is more computationally expensive. The detection graph can be built from the matched detection events of the sectioned qubit grid.

For instance, example aspects of the present disclosure can provide a computer-implemented method for tracking and/or mitigating effects of one or more errors in a quantum computing system. The quantum computing system can include a qubit grid including a plurality of qubits arranged in a grid configuration. The qubit grid can include one or more data qubits and one or more measurement qubits (e.g., ancilla qubits). For instance, in some implementations, the qubit grid can be an interlaced grid of data qubits and measurement qubits such that each data qubit is surrounded in the grid by measurement qubits and/or each measurement qubit is surrounded in the grid by data qubits (e.g., other than at edges of the qubit grid). The data qubits can perform computations for evaluation of one or more quantum algorithms. Additionally and/or alternatively, the measurement qubits can be configured to read out, stabilize and/or monitor parity of the quantum computing system (e.g., the data qubits). For instance, quantum measurements can be performed on the measurement qubits periodically, such as at on the order of microsecond intervals.

The qubit grid can be implemented according to various quantum error correction codes such as, for example, the quantum surface code or its simplified version, the repetition code. For instance, the repetition code can be a simplified version of the quantum surface code that is useful for certain tasks, such as testing. As an example, in some implementations of the surface code, physical qubits can be entangled together using a sequence of physical qubit CNOT operations, with subsequent measurements of the entangled states providing for error correction and error detection. A set of physical qubits entangled in this way can define a logical qubit that can provide improved performance compared to the underlying physical qubits. Quantum algorithms can be implemented based on these logical qubits. Example aspects of the present disclosure can be useful in quantum computing systems implementing such quantum error correction codes.

For instance, in some example implementations, the surface code can be implemented on a two-dimensional array of physical qubits The qubits are either data qubits, in which the computational quantum states are stored, or measurement qubits. The data qubits and/or the measurement qubits can meet requirements for quantum computation such as initialization, single-qubit rotations, and/or a two-qubit controlled-NOT (CNOT) between nearest neighbors. In addition, in some implementations, the data qubits and measurement qubits may be able to exchange their quantum states (a SWAP operation). In addition, it can be possible to measure quantum state of each qubit. The measurement qubits can be used to stabilize and manipulate the quantum state of the data qubits.

Changes in the measurement qubits can be indicative of physical errors and other errors in the qubit grid. For instance, unintended changes in quantum state from external interference, energy decay, fluctuations in energy differences between eigenstates, etc., can produce quantum errors that complicate quantum computing. In some implementations of the surface code, errors can be accounted for and/or corrected at the classical level, so the focus on the quantum level can be on error detection. Errors can occur on the physical qubits, such as the data or the measure qubits. Example errors include single qubit errors (e.g., erroneous g, Y or Z operations), measurement errors (e.g., reporting the incorrect outcome and projecting to the wrong state), initialization errors (e.g., setting a qubit to the wrong state), Hadamard errors (e.g., performing a Hadamard but in addition performing an erroneous X, Y or Z), and/or CNOT errors. Individual errors of these types can occur, but concatenated errors can also occur, such as, for example, two, three, or more adjacent data qubits suffering X, f or Z errors in one surface code cycle, creating error chains. In some implementations, the surface code can deal with all these errors if the errors that occur during each surface code cycle can be identified (i.e. decoding which specific error(s) occurred on which particular qubit(s)). Once identified, these errors can be tracked and the error information can be used to correct any subsequent measurement outcomes using the classical control software. One example method for error correction is the minimum weight perfect-matching algorithm, which provides an automated method for error correction that works especially well for sufficiently sparse errors.

In some embodiments, a global decoder (e.g., implemented using a plurality of processing units) can implement a general matching process (e.g., minimum-weight perfect matching). In some examples, a decoder can be implemented by an error detection and/or error tracking system for identifying errors in quantum computations. For example, in some cases, error detection measurements may be performed to record data descriptive of detection events in real time, such as in time slices and/or continuously. For instance, each time slice may correspond to a set of quantum gate operations at each of a plurality of qubits. The detection event data may be received with microsecond-level precision (e.g., half a microsecond) in some cases. In one example embodiment, a decoder implemented using a plurality of processing layers as described below can provide for globally matching one or more detection events (e.g., according to a matching process, such as minimum weight perfect matching). The path can be indicative of a most likely source of error which would trigger the matched endpoints.

In some cases, prompt detection and/or correction of these errors can be beneficial. For instance, in some cases, future logical operations can depend on the result of earlier logical measurements. A quantum computation can include many rounds of logical measurements, which determine future logical operations. As such, the processing latency of the classical level can bottleneck the processing of the quantum level if the errors are not detected and corrected in a low-latency manner. Thus, systems and methods according to example aspects of the present disclosure can improve the latency of this error detection and/or correction. Consequently, in some cases, this can improve the rate of processing of the quantum computer.

In some embodiments, a method according to example aspects of the present disclosure can include matching data associated with one or more detection events associated with a quantum computing system using a successive pattern structure comprising a plurality of processing layers. Each processing layer in the plurality of processing layers can be associated with a pattern including a plurality of sections. Each section can be associated with a processing unit operable to match one or more detection events near a center of the section. The method can include tracking one or more errors of a quantum computing system based at least in part on a matching of one or more detection events.

For instance, the method can include providing output of a qubit grid, sectioned into a first plurality of sections of a first processing layer, to a plurality of processing units respective to the first plurality of sections. The first plurality of sections can be based at least in part on or associated with a first pattern. For instance, each of the plurality of processing units can be associated with one of the first plurality of sections. For instance, in some implementations, the qubit grid can be divided into the first plurality of sections according to the first pattern. Each of the first plurality of sections can include a subset of the qubits of the qubit grid. For instance, in some implementations, the first pattern can include a plurality of rectangular patches. As another example, in some implementations, a section of the first plurality of sections can include a (e.g., rectangular) patch of about ten qubits by about ten qubits. As another example, in some implementations, the first pattern can be or can include a plurality of hexagonal patches.

Each section of the first plurality of sections of the first processing layer can be associated with one of a first plurality of processing units. As used herein, a "processing layer" is not necessarily, but may be, a physical hardware layer. For instance, a processing layer can refer to a collection of one or more processing unit(s) that process sections from a layered pattern in parallel. The processing layer can be organized in any suitable organizational manner. The processing unit(s) can be any suitable classical processing device (or portion of a processing device) configured to process read out measurements from the measurement qubits and perform matching of one or more detection events with other detection events and/or an edge in the detection graph. In some implementations, each processing unit can optionally be a hardware-encoded processor. For instance, each processing unit can be implemented by an application-specific integrated circuit (ASIC) and/or field-programmable gate array (FPGA). Because the qubit grid is divided into a plurality of sections, each section in the first plurality of sections associated with the first processing layer can be processed (with a corresponding processing unit) in parallel.

In some implementations, an area of a section of the first plurality of sections of the first processing layer can be based at least in part on a limit of a processing unit of the first plurality of processing units. As an example, the number of qubits comprising each section may be selected based on computational resource limits of contemporary matching algorithms and processing units. Improvements in classical hardware and algorithms may provide for larger patches covering more qubits in each section. This, in turn, may improve the performance of systems and methods according to example aspects of the present disclosure. For instance, larger sections can provide for a reduced likelihood of unmatched data after applying the patterns, which in turn reduces the frequency of using expensive space-time block algorithms to match the unmatched data.

The output of the qubits for each of the plurality of first sections in the first processing layer can be provided to a respective processing unit of a plurality of processing units associated with the first processing layer. The computer-implemented method can then include matching (e.g., by the computing system) one or more detection events near the center of the first plurality of sections from the plurality of processing units associated with the first processing layer. In this way, detection events near the center of the first plurality of sections in the first processing layer can be matched in parallel. Each processing unit can match detection events in its respective section in parallel with other processing units in the processing layer.

For instance, according to example aspects of the present disclosure, the first processing layer is very likely to successfully match one or more detection events near the center of the first plurality of sections. In some implementations, a detection event is near the center of a (e.g., rectangular) section at least $d/(2\sqrt{2}+4)$ away of an edge of the section, where d is the length of the edge. In overlapping rectangular sections from successive processing layers according to example aspects of the present disclosure, every detection event is at least this distance away from all edges of at least one section of at least one layer. In this manner, every detection event is near the center of at least one section, and thus has a higher likelihood of detection events being matched. As another example, in some implementations of overlapping (e.g., tessellated) hexagonal patterns, a detection event near the center of a section may be at least $d/(4\sqrt{3})$ away from an edge of the section.

The computer-implemented method can further include providing (e.g., by the computing system) output of the qubit grid, sectioned into a second plurality of sections, to a plurality of processing units respective to the second plurality of sections associated with a second processing layer. The second plurality of sections can be based at least in part on or associated with a second pattern. For instance, each one of the plurality of processing units can be associated with one of the second plurality of sections. The plurality of processing units associated with the second processing layer can be the same as or different from the plurality of processing units associated with the first processing layer.

The second pattern can be different from the first pattern. For instance, in some implementations, the second pattern can be arranged such that the second plurality of sections is centered on corners of the first pattern. As an example, if the first pattern includes rectangular sections having corners, the second pattern may also include rectangular sections where centers of the rectangles are at or near the corners of the first pattern. Additionally and/or alternatively, the area of the first plurality of sections may be greater than an area of the second plurality of sections. The computer-implemented method can further include matching (e.g., by the computing system) one or more detection events near the center of the second plurality of sections from the plurality of processing units associated with the second processing layer.

In some implementations, the computer-implemented method can further include providing (e.g., by the computing system) output of the qubit grid, sectioned into a third plurality of sections associated with a third processing layer, to a plurality of processing units respective to the third plurality of sections; and matching (e.g., by the computing system) one or more detection events near the center of the third plurality of sections from the plurality of processing units associated with the third processing layer. The third plurality of sections can be based at least in part on or associated with a third pattern. For instance, each of the plurality of processing units can be associated with one of the third plurality of sections. The plurality of processing units associated with the third processing layer can be the same as or different from the plurality of processing units associated with the first processing layer and/or the second processing layer.

The third pattern can be different from the first pattern and/or the second pattern. For instance, in some implementations, the third pattern can be arranged such that each of the third plurality of sections is centered on (e.g., center points of) edges of the first pattern. As an example, if the first pattern includes rectangular sections having edges, the third pattern may also include rectangular sections where centers of the rectangles are at or near the edges of the first pattern.

Aspects of the present disclosure are discussed with two or three processing layers for purposes of illustration and discussion. Those of ordinary skill in the art, using the disclosures provided herein, will understand that more layers can be used without deviating from the scope of the present disclosure.

In some implementations, the computer-implemented method can further include providing (e.g., by the computing system) remaining unmatched output of the plurality of processing units to one or more processing units associated with a final processing layer configured to match the remaining unmatched information. However, a relative few detection events may be unmatched after implementation of the first, second, and/or third processing layers. The final processing layer may employ one or more space-time block algorithms to match the remaining unmatched detection event(s) of the plurality of processing units. The final processing layer may also be computationally more expensive than the earlier layers. For instance, the final processing layer may take potentially arbitrary space-time blocks of data to match the remaining data. The one or more processing units configured to implement the final processing layer can be the same as or different from the processing units associated with the first processing layer, the second processing layer, or the third processing layer.

The use of a plurality of processing layers and/or the final processing layer can provide a parallelized, scalable approach to matching qubit error information from a qubit grid. This approach can ensure that the matching is complete (e.g., that every detection event is matched) while the focus on local matching can provide for lower latency and/or other improvements over existing approaches. For instance, a detection event that is not near the center of a section in the first pattern, and consequently less likely to be matched within that section, is likely to be matched in a subsequent processing layer in all but extremely rare cases. In these rare cases, the final processing layer using space-time block algorithms can ensure this data is still matched. Thus, a completed matching of the detection events can be generated in a highly scalable and parallelized manner.

In some implementations, the method can further include tracking and/or mitigating (e.g., by the computing system) one or more errors in the quantum computing system based at least in part on a matching of one or more detection events. The matching can include the one or more detection events near the center of the first plurality of sections of the first processing layer and the one or more detection events near the center of the second plurality of sections of the second processing layer. For instance, the matching can include any of the matched qubit information from the plurality of processing units such as a complete matching of the information from the qubit grid. Once the matching is completed, the matching can be useful as, for example, a detection graph in a decoder for quantum error tracking and/or mitigation.

Advantageously, in example embodiments according to aspects of the present disclosure, local preprocessing of the detection graphs can be performed in parallel. In some embodiments, local preprocessing can include no-communication preprocessing. For instance, local preprocessing can be applied in a pipelined configuration. In some embodiments, each qubit subset can be configured to stream locally preprocessed error detection measurements and/or detection graph data to a global decoder (e.g., for real-time global decoding of correlated errors). In some embodiments, local preprocessing can optionally be implemented in a hardware-encoded processor. For instance, local preprocessing can be performed by an application-specific integrated circuit (ASIC) and/or field-programmable gate array (FPGA).

Example aspects of the present disclosure are described herein with respect to quantum computing applications and error detection for the purposes of illustration. Example aspects of the present disclosure can be beneficial for detecting and evaluating errors in quantum computing systems. In addition, the general problem of weighted matching in graphs can be useful in other applications, including many engineering disciplines. In some cases, example aspects of the present disclosure can be applied to such other applications in accordance with the present disclosure.

Systems and methods according to example aspects of the present disclosure can provide for a number of technical effects and benefits, including but not limited to improvements to computing technology (e.g., quantum computing technology). For instance, example aspects of the present disclosure can provide for reduced evaluation time of error information and/or evaluating error information in a scalable manner. Example aspects of the present disclosure also provide a unique focus on low latency, which is a critical aspect of high-performance quantum computers. This is especially beneficial in real-world (e.g., noisy) quantum computing applications, which present a need for rapid, real-time error tracking on an increasing number of qubits.

With reference now to the FIGS., example embodiments of the present disclosure will be discussed in further detail. As used here, the use of the term "about" in conjunction with a value refers to within 20% of the value.

FIG. 1 depicts an example quantum computing system 100 according to example embodiments of the present disclosure. The example system 100 is an example of a system on one or more classical computers or quantum computing devices in one or more locations, in which the systems, components, and techniques described below can be implemented. Those of ordinary skill in the art, using the disclosures provided herein, will understand that other quantum computing structures or systems can be used without deviating from the scope of the present disclosure.

The system 100 includes quantum hardware 102 in data communication with one or more classical processors 104. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits. In some implementations, the multi-level quantum subsystems can include superconducting qubits, such as flux qubits, charge qubits, transmon qubits, gmon qubits, etc.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

The readout device(s) 114 can take advantage of a difference in the impedance for the $|0\rangle$ and $|1\rangle$ states of an element of the quantum system, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

Figure 2:
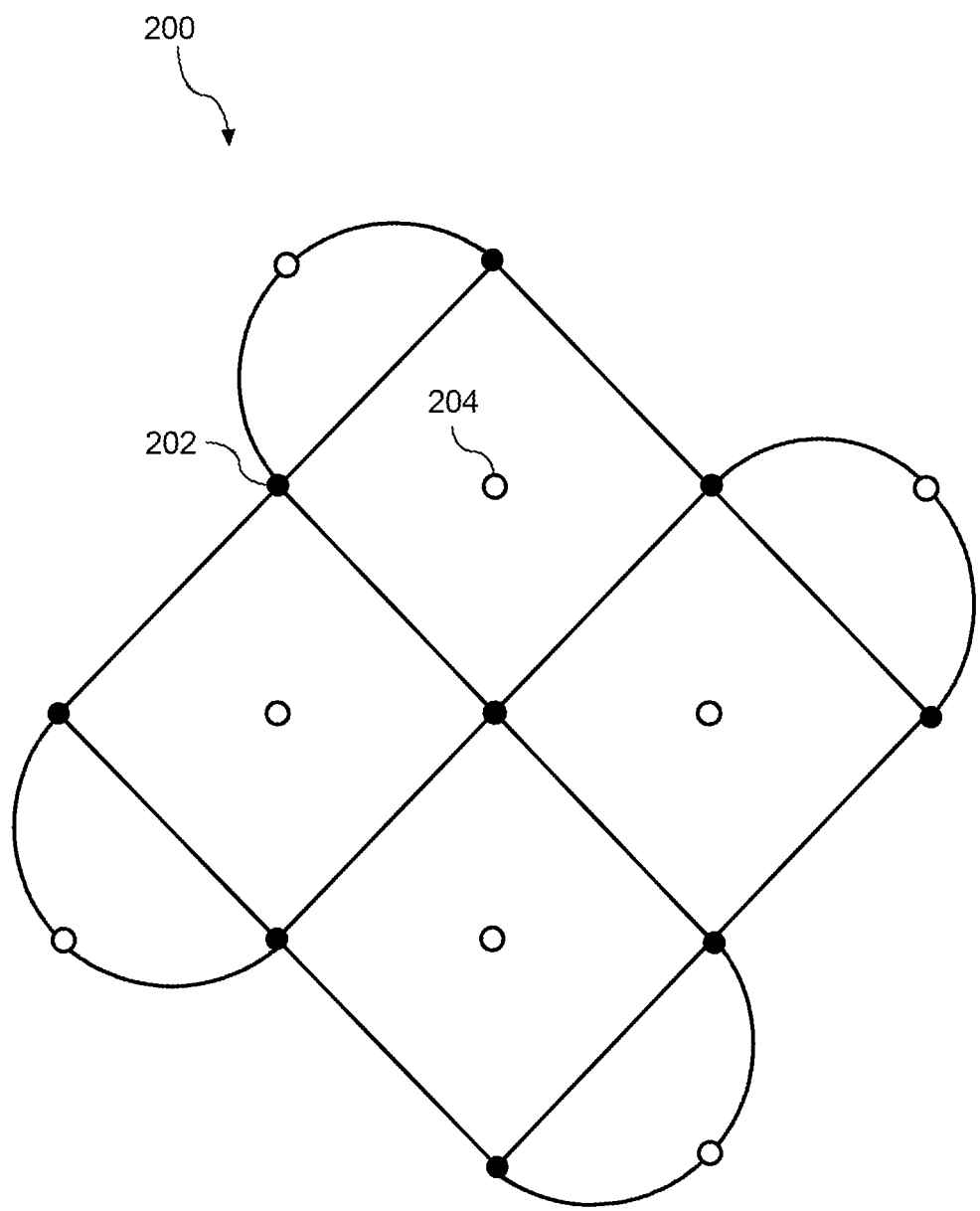
FIG. 2 depicts an example qubit grid according to example aspects of the present disclosure.

FIG. 2 depicts an example qubit grid 200 according to example embodiments of the present disclosure. For instance, the qubit grid 200 can be provided according to the quantum surface code, repetition code, etc. As illustrated in FIG. 2, qubit grid 200 can be an interlaced qubit grid of one or more data qubits 202 and/or one or more measurement qubits 204. The measurement qubits 204 can be configured to provide readouts and/or measure errors (e.g., parity) in outputs of the data qubits 202. For instance, some of all of the data qubits 202 can be used to implement a time series of quantum gate operations defining a quantum algorithm across some or all data qubits 202. As illustrated in FIG. 2, a data qubit 202 can be surrounded by measurement qubits 204. Additionally and/or alternatively, a measurement qubit 204 can be positioned within a square or other surface defined by two or more (e.g., four) data qubits 202.

Figure 3:
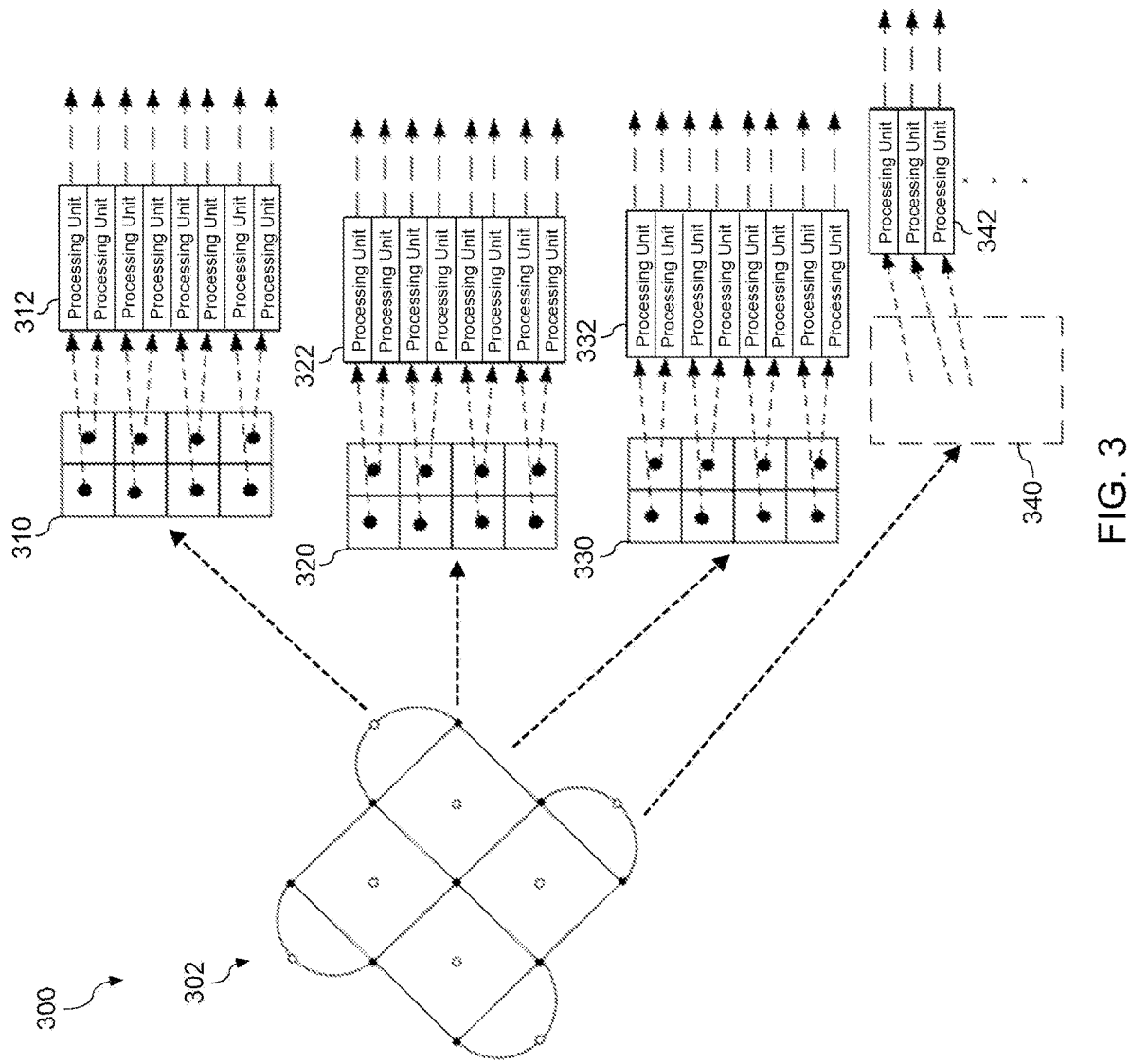
FIG. 3 depicts a representative diagram of error tracking using processing layers according to example embodiments of the present disclosure.

FIG. 3 depicts a representative diagram 300 of error tracking using processing layers according to example embodiments of the present disclosure. For instance, a output of a qubit grid 302 can be sectioned into a first plurality of sections by first processing layer 310. The sections, as sectioned by first processing layer 310, can each be provided to a respective processing unit 312. Detection events from the qubit grid 302 near the center of sections of the first processing layer 310 may be matched by processing units 312. Additionally, output of the qubit grid can be sectioned into a second plurality of sections by the second processing layer 320. The sections, as sectioned by second processing layer 320, can each be provided to a respective processing unit 322. The processing units 322 can match detection events from qubit grid 302 near the center of sections of the second processing layer 320. Similarly, output of the qubit grid can be sectioned into a third plurality of sections by the third processing layer 330. The sections, as sectioned by third processing layer 330, can each be provided to a respective processing unit 332. The processing units 332 can match detection events from qubit grid 302 near the center of sections of the third processing layer 330. Finally, the final processing layer 340 can employ one or more space-time block algorithms to match remaining unmatched detection event(s) from the qubit grid 302. For instance, the final processing layer 340 may use potentially arbitrary space-time blocks of data as input to the processing units 342 to match the remaining data. A detection graph can be built from the matched detection events from the processing layers.

The processing units 312, 322, 332, and/or 342 may be or may include distinct processing units and/or may be the same processing units used in sequence. For instance, a set of processing units may first process the first processing layer 310, then process the second processing layer 320, then process the third processing layer 330, and finally process the final processing layer 340. Each of the processing units may operate in parallel on a single processing layer. As an example, the processing units 312 may first match detection events near the center of sections of first processing layer 310. Subsequently, the processing units 322 can match detection events near the center of sections of second processing layer 320. Subsequently, the processing units 332 can match detection events near the center of sections of third processing layer 330. Finally, the processing units 342 can use the arbitrary space-time blocks of final processing layer 340 to match any remaining unmatched data. In this way, each detection event has a high likelihood of being matched in a scalable, parallelizable manner.

Figure 4:
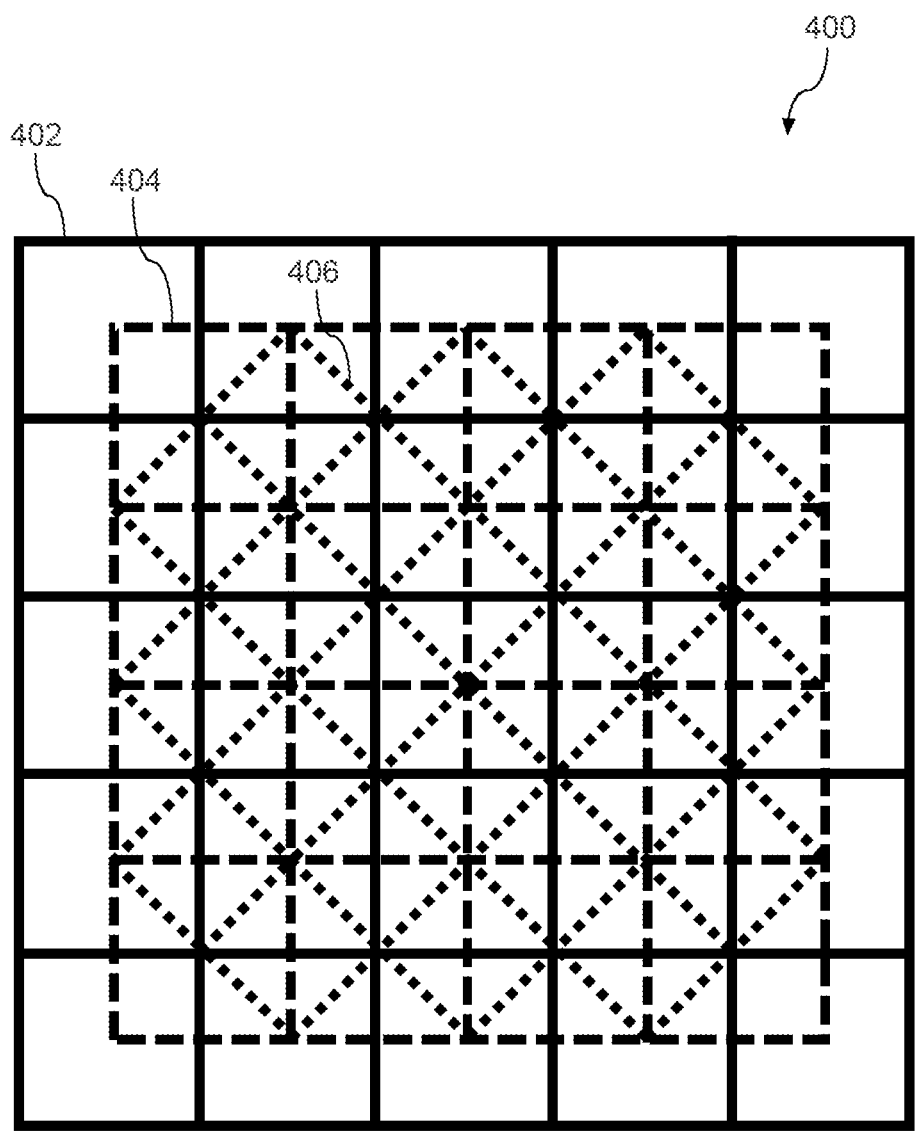
FIG. 4 depicts example layered patterns for matching detection events according to example aspects of the present disclosure.

FIG. 4 depicts an example successive pattern structure 400 having a plurality of processing layers for matching output of a qubit grid according to example aspects of the present disclosure. Each of the processing layers in the successive pattern 400 can divide a qubit grid into a plurality of sections. Each section can be associated with one processing unit of a plurality of processing units configured to process measurements from a subset of the plurality of qubits and match detection events according to example embodiments of the present disclosure.

More particularly, the successive pattern structure 400 includes a first processing layer 402, a second processing layer 404, and a third processing layer 406. Each of the first processing layer 402, the second processing layer 404, and third processing layer 406 includes a plurality of sections. Each section is associated with one processing unit of a plurality of processing unit. Each processing unit is operable to process readout measurements from qubits within its corresponding section and match one or more detection events.

The processing unit can be any suitable classical processing device (or portion of a processing device) configured to process read out measurements from the measurement qubits and perform matching of one or more detection events with other detection events and/or an edge in the detection graph. In some implementations, each processing unit can optionally be a hardware-encoded processor. For instance, each processing unit can be implemented by an application-specific integrated circuit (ASIC) and/or field-programmable gate array (FPGA). Because the qubit grid is divided into a plurality of sections, each section in the first plurality of sections associated with the first processing layer can be processed (with a corresponding processing unit) in parallel.

In the example illustrated in FIG. 4, the patterns of the processing layers in the successive pattern structure 400 are rectangular patches. For instance, first processing layer 402 includes a plurality of rectangular patches that span a largest area of the qubit grid. As illustrated, each of the sections of processing layer 402 includes edges and corners. Second processing layer 404 additionally includes a plurality of rectangular patches. As illustrated in FIG. 4, the sections of second processing layer 404 are centered on corners of sections of the first processing layer 402. For instance, a centroid of a section of second processing layer 404 can be positioned at or near the corners of sections of first processing layer 402. In some implementations, an area of the qubit grid measured by first processing layer 402 can be greater than that covered by second processing layer 404. In some implementations, the length of an edge of second processing layer 404 may be equal to the length of an edge of first processing layer 402. For instance, the second processing layer 404 may have one fewer section across a dimension compared to first processing layer 402.

Third processing layer 406 additionally includes a plurality of rectangular patches. As illustrated in FIG. 4, edges of third processing layer 406 can be diagonal to edges of first processing layer 402 and/or second processing layer 404. Additionally and/or alternatively, the sections of third processing layer 406 can be centered on edges of first processing layer 402. For instance, in some implementations, centroids of sections of third processing layer 406 can be centered on (e.g., centroids of) edges of first processing layer 402. Additionally and/or alternatively, in some implementations, an area of the qubit grid covered by third processing layer 406 can be less than that covered by first processing layer 402 and/or second processing layer 404. In some implementations, edges of third processing layer 406 can be or can include hypotenuses of triangles formed by rectangular patches of second processing layer 404.

Figure 5:
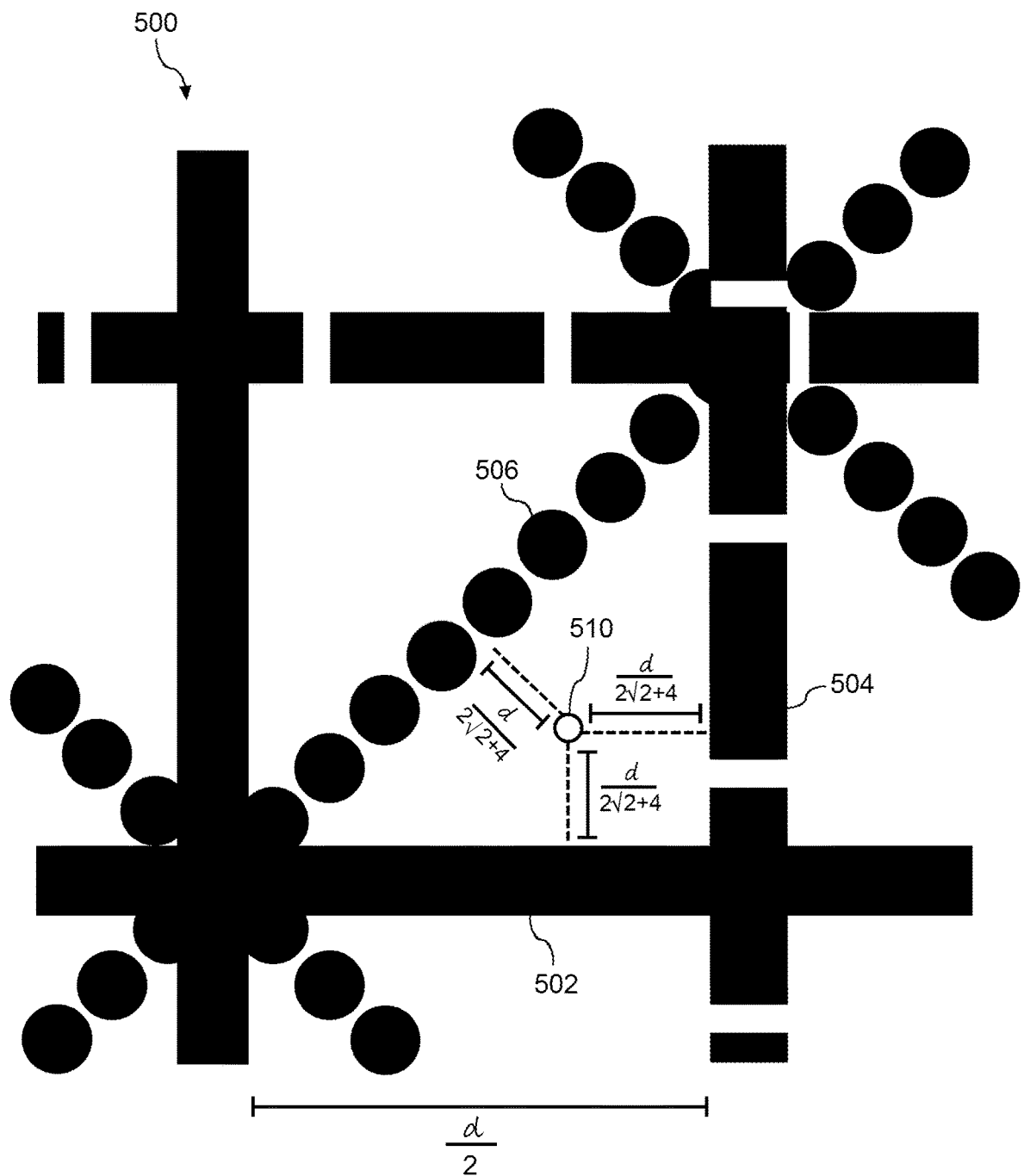
FIG. 5 depicts a portion of example layered patterns for matching detection events according to example aspects of the present disclosure.

FIG. 5 depicts a portion 500 of example processing layers for matching output of a qubit grid according to example aspects of the present disclosure. For instance, the portion 500 can be a portion of the pattern structure 400 of FIG. 4. FIG. 5 illustrates a triangle formed by a first edge 502 of a first processing layer, a second edge 504 of a second processing layer, and a third edge 506 of a third processing layer. As illustrated in FIG. 5, in this configuration, a detection event 510 is positioned at a certain minimum distance from edges of at least one section. Thus, a detection event can be near the center of a section if it is at or greater than this minimum distance. As illustrated in FIG. 5, the minimum distance can be $$\frac{d}{2\sqrt{2}+4},$$

where d is the length of an edge of the first processing layer (e.g., first edge 502).

Figure 6:
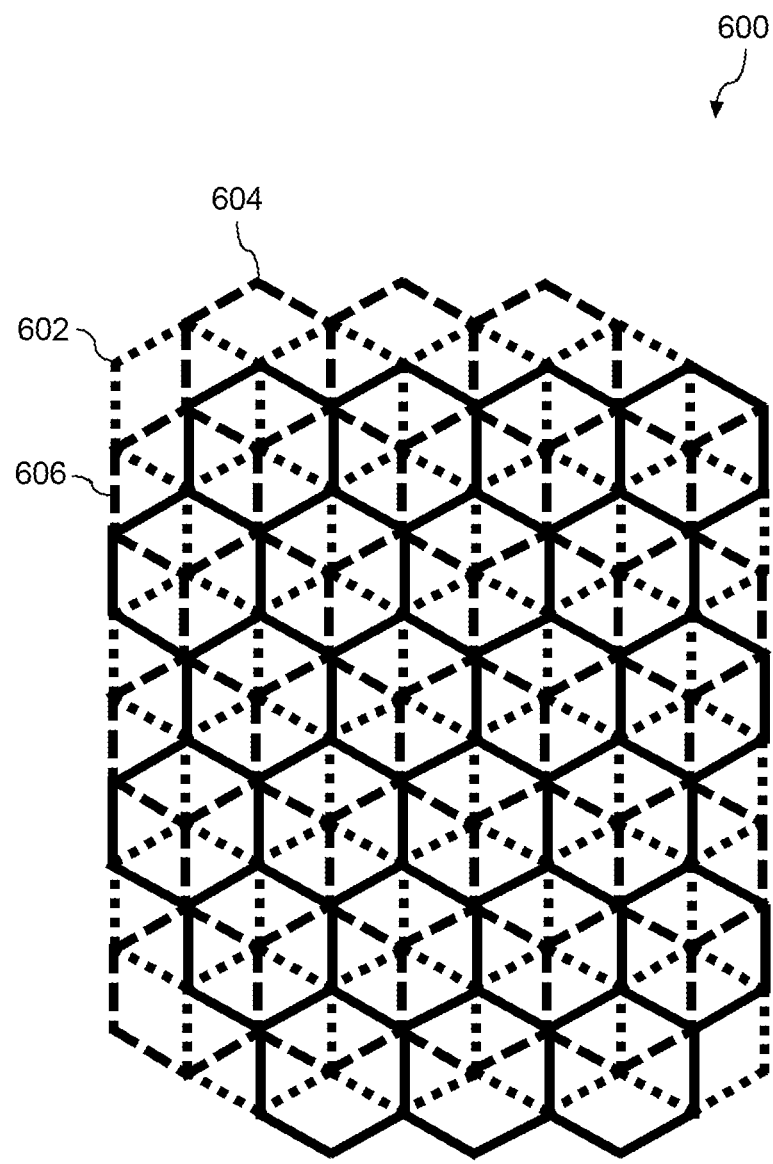
FIG. 6 depicts example layered patterns for matching detection events according to example aspects of the present disclosure.

FIG. 6 depicts example layered processing layers 600 for matching output of a qubit grid according to example aspects of the present disclosure. As illustrated in FIG. 6, the processing layers 600 can include first processing layer 602, second processing layer 604, and/or third processing layer

606. In the configuration illustrated in FIG. 6, the processing layers 600 can each include a plurality of hexagonal patches. The processing layers 600 can be tessellated with respect to other patterns such that the processing layers 600 cover each qubit of the qubit grid. In some implementations with hexagonal patches, the centers of sections of one processing layer can be centered on alternating corners of another processing layer. For example, sections of second processing layer 604 and sections of third processing layer 606 are centered on corners of sections of first processing layer 602 such that the centered section alternates between the second processing layer 604 and the third processing layer 606 around the periphery of the sections of the first processing layer 602.

Figure 7:
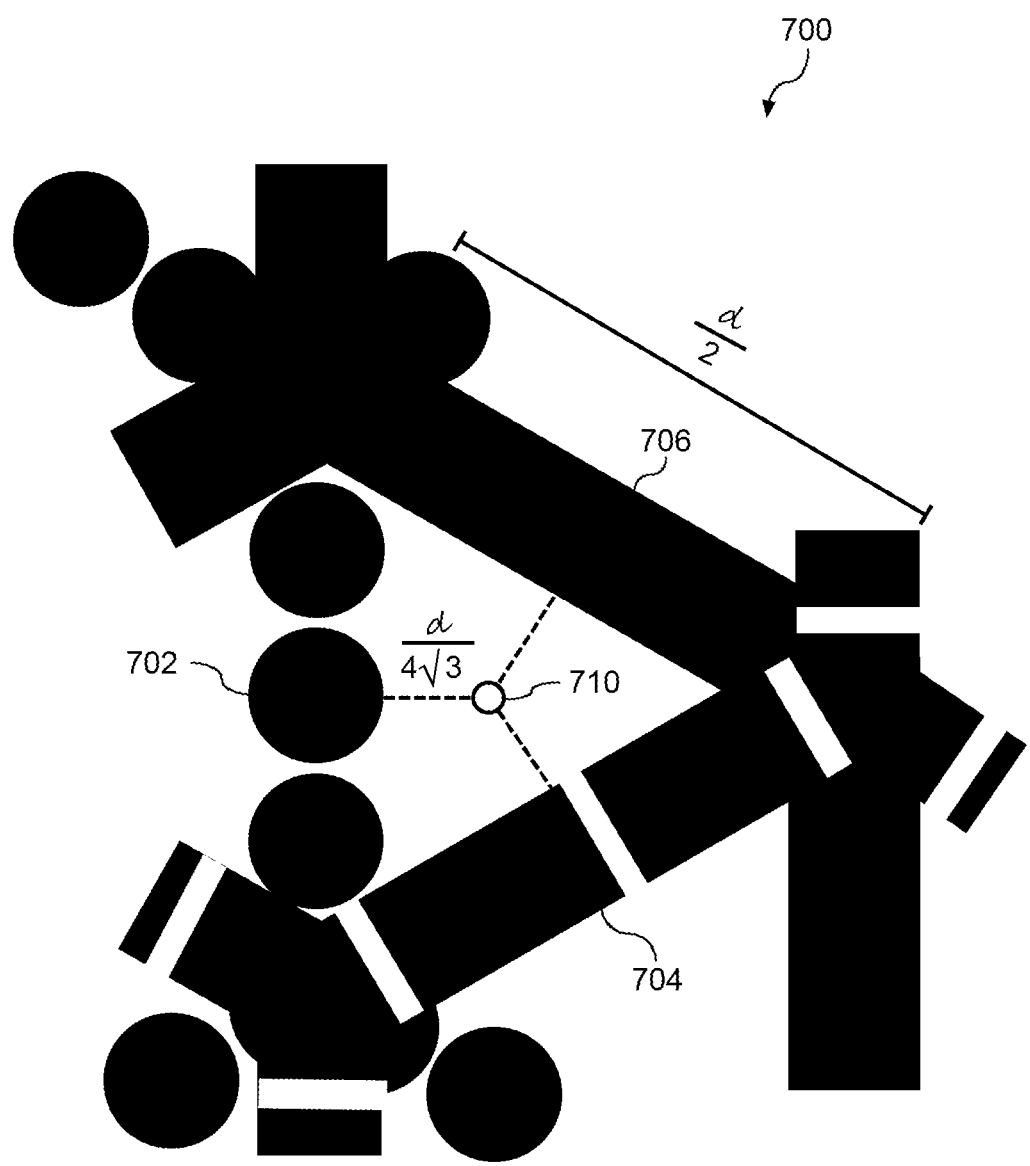
FIG. 7 depicts a portion of example layered patterns for matching detection events according to example aspects of the present disclosure.

FIG. 7 depicts a portion 700 of example layered processing layers for matching output of a qubit grid according to example aspects of the present disclosure. For instance, the portion 700 can be a portion of the pattern structure 600 of FIG. 6. FIG. 7 illustrates a triangle formed by a first edge 702 of a first processing layer, a second edge 704 of a second processing layer, and a third edge 706 of a third processing layer. As illustrated in FIG. 7, in this configuration, a detection event 710 is positioned at a certain minimum distance from edges of at least one section. Thus, a detection event can be near the center of a section if it is at or greater than this minimum distance. As illustrated in FIG. 7, the minimum distance can be $$\frac{d}{4\sqrt{3}},$$

where d is the length of an edge (e.g., first edge 702).

Figure 8:
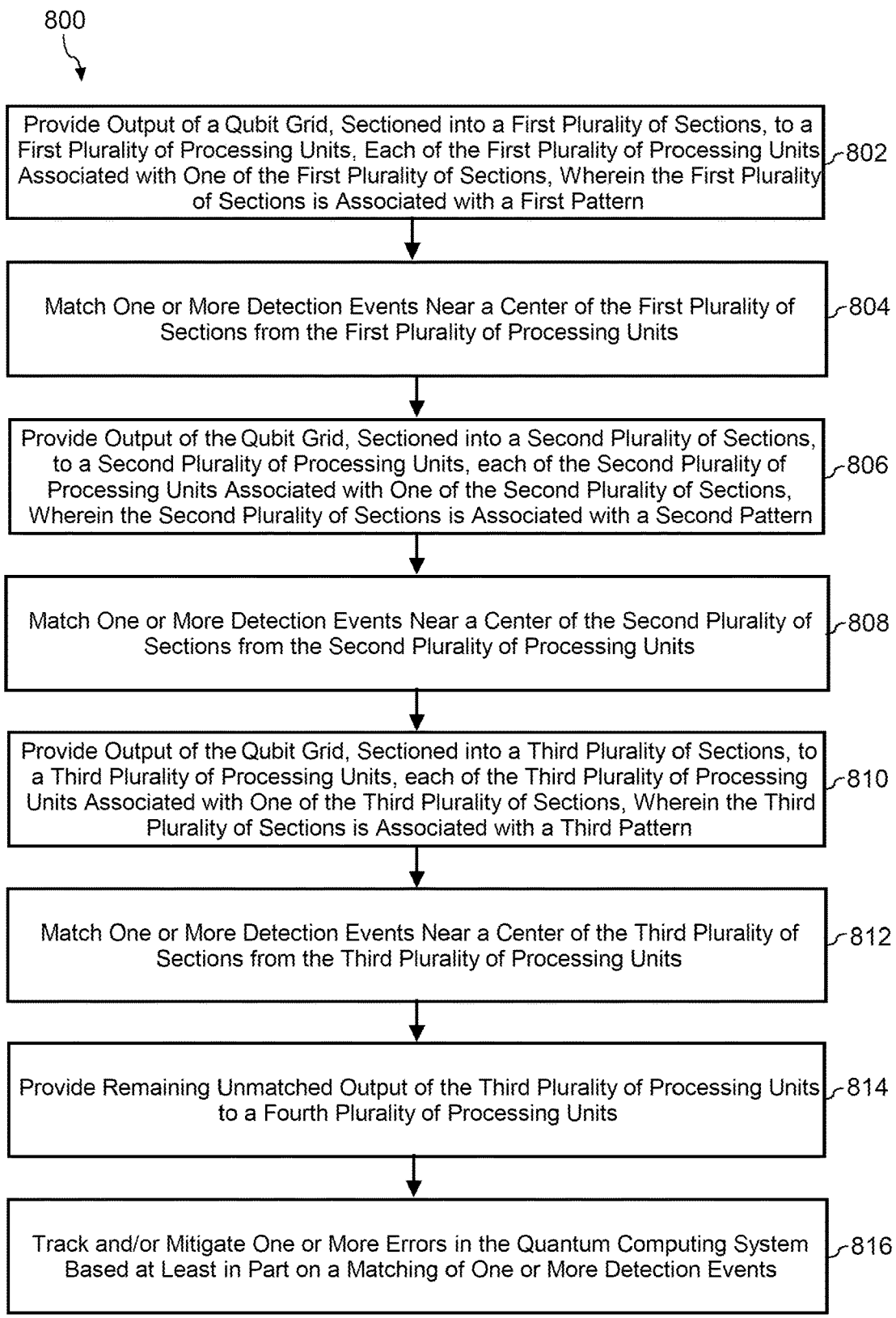
FIG. 8 depicts a flow chart of an example method for tracking errors in a quantum computing system according to example aspects of the present disclosure.

FIG. 8 depicts a flow chart of an example method 800 for tracking errors in a quantum computing system according to example aspects of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, include steps not illustrated, modified, and/or adapted in various ways without deviating from the scope of the present disclosure. The method 800 can be implemented by any suitable computing system, such as a quantum computing system including quantum hardware in communication with one or more quantum control devices, such as quantum computing system 100 of FIG. 1.

The quantum computing system can include a qubit grid including a plurality of qubits arranged in a grid configuration. The qubit grid can include one or more data qubits and one or more measurement qubits. For instance, in some implementations, the qubit grid can be an interlaced grid of data qubits and measurement qubits such that each data qubit is surrounded in the grid by measurement qubits and/or each measurement qubit is surrounded in the grid by data qubits (e.g., other than at edges of the qubit grid). The data qubits can perform computations for evaluation of one or more quantum algorithms. Additionally and/or alternatively, the measurement qubits can be configured to read out and/or monitor parity of the quantum computing system (e.g., the data qubits). For instance, quantum read-outs can be read out of the measurement qubits periodically, such as at on the order of microsecond intervals.

The qubit grid can be implemented according to various quantum error correction codes such as, for example, the quantum surface code or its simplified version, the repetition code. For instance, the repetition code can be a simplified version of the quantum surface code that is useful for certain tasks, such as testing. Example aspects of the present disclosure can be useful in quantum computing systems according to quantum error correction codes having alternating grids of qubits.

The method 800 can include, at 802, providing output of a qubit grid, sectioned into a first plurality of sections, to a plurality of processing units respective to the first plurality of sections. Each processing unit in the plurality of processing units can correspond to one of the first plurality of sections in the first processing layer. The first plurality of sections can be based at least in part on or associated with a first pattern. For instance, in some implementations, the qubit grid can be divided into the first plurality of sections according to the first pattern. Each of the first plurality of sections can include a subset of the qubits of the qubit grid. For instance, in some implementations, the first pattern can include a plurality of rectangular patches. As another example, in some implementations, a section of the first plurality of sections can include a (e.g., rectangular) patch of about ten qubits by about ten qubits. As another example, in some implementations, the first pattern can be or can include a plurality of hexagonal patches.

Each section of the first plurality of sections of the first processing layer can be associated with one of a first plurality of processing units. The processing unit can be any suitable classical processing device (or portion of a processing device) configured to process read out measurements from the measurement qubits and perform matching of one or more detection events with other detection events and/or an edge in the detection graph. In some implementations, each processing unit can optionally be a hardware-encoded processor. For instance, each processing unit can be implemented by an application-specific integrated circuit (ASIC) and/or field-programmable gate array (FPGA). Because the qubit grid is divided into a plurality of sections, each section in the first plurality of sections associated with the first processing layer can be processed (with a corresponding processing unit) in parallel.

In some implementations, an area of a section of the first plurality of sections of the first processing layer can be based at least in part on a limit of a processing unit of the first plurality of processing units. As an example, the number of qubits each section may be selected based on computational resource limits of contemporary matching algorithms and processing units. Improvements in classical hardware and algorithms may provide for larger patches covering more qubits in each section. This, in turn, may improve the performance of systems and methods according to example aspects of the present disclosure. For instance, larger sections can provide for a reduced likelihood of unmatched data after applying the patterns, which in turn reduces the frequency of using expensive space-time block algorithms to match the unmatched data.

The output of the qubits for each section can be provided to a respective processing unit of a plurality of processing units associated with the first pattern. The computer-implemented method 800 can then include, at 804, matching (e.g., by the computing system comprising the one or more processing units) one or more detection events near the center of the first plurality of sections from the plurality of processing units. A detection event can correspond to an error measurement. For instance, a detection event can be associated with one or more measurements with odd parity produced by measurement qubit(s). For instance, according to example aspects of the present disclosure, the first layer of processing is very likely to successfully match information from qubits near the center of the first plurality of sections.

In some implementations, a detection event near the center of a (e.g., rectangular) section is at least $d/(2\sqrt{2}+4)$ away from an edge of the section, where d is the length of the edge. In overlapping rectangular sections according to example aspects of the present disclosure, every qubit is at least this distance away from all edges of at least one section of at least one layer. In this manner, every detection event is near the center of at least one section, and thus has a higher likelihood of detection events being matched. As another example, in some implementations of overlapping (e.g., tessellated) hexagonal patterns, a detection even near the center of a section may be at least $d/(4\sqrt{3})$ from an edge of the section.

The computer-implemented method 800 can further include, at 806, providing output of the qubit grid, sectioned into a second plurality of sections, to a plurality of processing units respective to the second plurality of sections. The second plurality of sections can be based at least in part on or associated with a second pattern. For instance, each of the plurality of processing units can be associated with one of the second plurality of sections. The second pattern can be different from the first pattern. For instance, in some implementations, the second pattern can be arranged such that the plurality of processing units is centered on corners of the first pattern. As an example, if the first pattern includes rectangular sections having corners, the second pattern may also include rectangular sections where centers of the rectangles are at or near the corners of the first pattern. Additionally and/or alternatively, the area of the first plurality of sections may be greater than an area of the second plurality of sections. The computer-implemented method 800 can further include, at 808 matching (e.g., by the computing system comprising the one or more processing units) one or more detection events near the center of the second plurality of sections from the plurality of processing units.

In some implementations, the computer-implemented method 800 can optionally include, at 810, providing output of the qubit grid, sectioned into a third plurality of sections, to a plurality of processing units respective to the third plurality of sections; and, at 812, matching (e.g., by the computing system comprising the one or more processing units) one or more detection events near the center of the third plurality of sections. The third plurality of sections can be based at least in part on or associated with a third pattern. For instance, each of the plurality of processing units can be associated with one of the third plurality of sections. The third pattern can be different from the first pattern and/or the second pattern. For instance, in some implementations, the third pattern can be arranged such that the plurality of processing units is centered on (e.g., center points of) edges of the first pattern. As an example, if the first pattern includes rectangular sections having edges, the third pattern may also include rectangular sections where centers of the rectangles are at or near the edges of the first pattern.

In some implementations, the computer-implemented method 800 can optionally include, at 814, providing remaining unmatched output of the plurality of processing units to a plurality of processing units. For instance, in some cases, the plurality of processing units, the plurality of processing units, and the plurality of processing units may generally match most or all of the detection events that are measured from the qubit grid. However, a relative few of the detection events may be unmatched after this processing, and this plurality of processing units may comprise a final processing layer that matches the remaining unmatched information. The final processing layer may employ one or more space-time block algorithms to match the remaining unmatched output of the plurality of processing units. The final processing layer may also be computationally more expensive than the earlier layers. For instance, the final processing layer may take potentially arbitrary space-time blocks of data to match the remaining data.

The use of a plurality of processing layers according to example aspects of the present disclosure and/or the final processing layer can provide a parallelized, scalable approach to matching qubit error information from a qubit grid. This approach can ensure that the matching is complete (e.g., that every qubit is matched) while the focus on local matching can provide for lower latency and/or other improvements over existing approaches. For instance, a detection event that is not near the center of a section in the first pattern, and consequently less likely to be matched within that section, is likely to be matched in a subsequent layer in all but extremely rare cases. In these rare cases, the final processing layer using space-time block algorithms can ensure this data is still matched. Thus, a completed matching of the qubit error information can be generated in a highly scalable and parallelized manner.

In some implementations, the method 800 can further include, at 816, tracking and/or mitigating (e.g., by the computing system) one or more errors in the quantum computing system based at least in part on a matching of error information. The matching can include the one or more detection events near the center of the first plurality of sections and the one or more detection events near the center of the second plurality of sections. For instance, the matching can include any of the matched qubit information from the plurality of processing units, such as a complete matching of the information from the qubit grid. Once the matching is completed, the matching can be useful as, for example, a detection graph in a decoder for quantum error tracking and/or correction.

Figure 9:
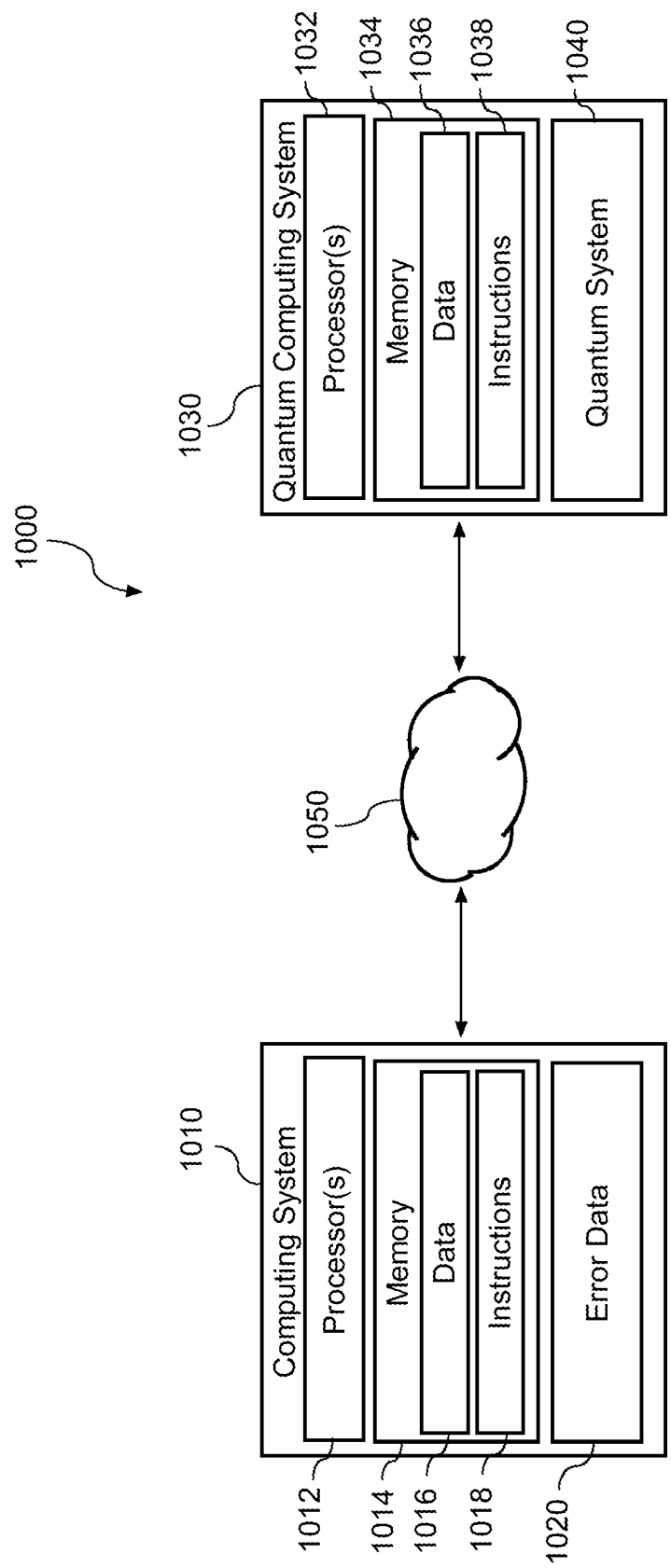
FIG. 9 depicts an example computing system according to example embodiments of the present disclosure.

FIG. 9 depicts a block diagram of an example computing system 1000 that can be used to implement the systems and methods according to example embodiments of the present disclosure, such as the system discussed with reference to FIG. 1. The system 1000 includes a control system 1010 and a quantum computing system 1030 that are communicatively coupled over a network 1050. One or more aspects of any of the methods described herein can be implemented on the control system 1010 and/or the quantum computing system 1030.

The control system 1010 can include any type of computing device (e.g., classical computing device). The control system 1010 includes one or more processors 1012 and a memory 1014. The one or more processors 1012 can include any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage mediums, such as RAM, ROM, EEPROM, EPROM, flash memory devices, magnetic disks, etc., and combinations thereof. The memory 1014 can store data 1016 (e.g., qubit parameters, measurements, etc.) and instructions 1018 which are executed by the processor 1012 to cause the control system 1010 to perform operations, such as one or more aspects of any of the method disclosed herein. The control system 1010 can be configured to process error information 1020 obtained by measuring outputs of a quantum system (e.g., quantum system 1040) to identify errors in quantum computations according to example embodiments of the present disclosure. Additionally, the quantum control system 1010 can be configured to control operation (e.g., transition frequency) of the quantum system 1040.

The quantum computing system 1030 includes one or more processors 1032 and a memory 1034. The one or more processors 1032 can include suitable processing device (e.g., a processor core, a microprocessor, an ASIC, a FPGA, a controller, a microcontroller, etc.) and can be one processor or a plurality of processors that are operatively connected. The one or more processors 1032 can include the plurality of processing units each associated with a section of a processing layer according to example embodiments of the present disclosure. The memory 1034 can include one or more non-transitory computer-readable storage mediums, such as RAM, ROM, EEPROM, EPROM, flash memory devices, magnetic disks, etc., and combinations thereof. The memory 1034 can store data 1036 and instructions 1038 which are executed by the processor 1032 to cause the quantum computing system 1030 to perform operations, such as implementation of a quantum circuit having one or more quantum gates on a quantum system 1040 having a plurality of qubits and obtaining associated measurements (e.g., error information 1020). The quantum computing system 1030 can be similar to the quantum computing system discussed and described with reference to FIG. 1. Other suitable quantum computing systems can be used without deviating from the scope of the present disclosure.

The network 1050 can be any type of communications network, such as a local area network (e.g., intranet), wide area network (e.g., Internet), or some combination thereof and can include any number of wired or wireless links. In general, communication over the network 1050 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). In some implementations, the network 1050 may be omitted such that the control system 1010 is in direct signal communication with quantum computing system 1030.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for tracking one or more errors in a quantum computing system, the method comprising:
providing, by a computing system comprising one or more computing devices, a first output of a plurality of qubits to a plurality of processing units, the plurality of qubits sectioned into a first plurality of sections, each of the plurality of processing units associated with one of the first plurality of sections, wherein the first plurality of sections is associated with a first pattern;

for at least one first section of the first plurality of sections matching, by the computing system, one or more first detection events near a center of the at least one first section of the first plurality of sections with another detection event or an edge in a detection graph;

providing, by the computing system, a second output of the plurality of qubits to the plurality of processing units, the plurality of qubits sectioned into a second plurality of sections, each of the plurality of processing units associated with one of the second plurality of sections, wherein the second plurality of sections is associated with a second pattern; and for at least one second section of the second plurality of sections matching, by the computing system, one or more second detection events near a center of the at least one second section of the second plurality of sections with another detection event or an edge in the detection graph;

mitigating one or more errors in the quantum computing system based at least in part on the one or more first detection events or second detection events.

2. The computer-implemented method of claim 1, wherein the one or more first detection events near the center of the at least one first section is at least $$\frac{d}{2\sqrt{2}+4}$$

away from an edge of the at least one first section, where d is a length of the edge.

3. The computer-implemented method of claim 1, wherein the first pattern comprises a plurality of rectangular patches.

4. The computer-implemented method of claim 1, wherein the first pattern comprises a plurality of hexagonal patches.

5. The computer-implemented method of claim 1, wherein the at least one first section of the first plurality of sections comprises a patch of about ten qubits by about ten qubits.

6. The computer-implemented method of claim 1, wherein an area of the at least one first section of the first plurality of sections is greater than an area of the at least one second section of the second plurality of sections.

7. The computer-implemented method of claim 1, wherein an area of the at least one first section of the first plurality of sections is based at least in part on a limit of a processing unit of the plurality of processing units.

8. The computer-implemented method of claim 1, wherein each section of the plurality of second sections is centered on corners of the first pattern.

9. The computer-implemented method of claim 1, wherein the method further comprises:
providing, by the computing system, a third output of the plurality of qubits to the plurality of processing units, the plurality of qubits sectioned into a third plurality of sections, each of the plurality of processing units associated with one of the third plurality of sections, wherein the third plurality of sections is associated with a third pattern; and for at least one third section of the third plurality of sections matching, by the computing system, one or more third detection events near a center of the at least one third section of the third plurality of sections with another detection event or an edge in the detection graph.

10. The computer-implemented method of claim 9, wherein the method further comprises:
providing, by the computing system, a remaining unmatched output of the plurality of qubits to the plurality of processing units.

11. The computer-implemented method of claim 10, wherein the plurality of processing units are configured to employ one or more space-time block algorithms to match the remaining unmatched output.

12. The computer-implemented method of claim 9, wherein each section of the third plurality of sections of the third pattern is centered on edges of the first pattern.

13. The computer-implemented method of claim 1, wherein the plurality of qubits comprises a plurality of qubits in a grid configuration.

14. The computer-implemented method of claim 13, wherein the plurality of qubits comprises one or more data qubits and one or more measurement qubits.

15. A quantum computing system comprising:
quantum hardware comprising a qubit grid, the qubit grid comprising a plurality of qubits in a grid configuration; and
one or more classical processors configured to perform operations, the operations comprising:
providing a first output of the qubit grid, sectioned into a first plurality of sections, to a plurality of processing units, each of the plurality of processing units associated with one of the first plurality of sections, wherein the first plurality of sections is associated with a first pattern;
for at least one first section of a first plurality of sections matching one or more first detection events near a center of at least one first section of the first plurality of sections with another detection event or an edge in a detection graph;
providing a second output of the qubit grid, sectioned into a second plurality of sections, to the plurality of processing units, each of the plurality of processing units associated with one of the second plurality of sections, wherein the second plurality of sections is associated with a second pattern; and
for at least one second section of the second plurality of sections matching one or more second detection events near a center of the at least one second section of the second plurality of sections with another detection event or an edge in a detection graph;
mitigating one or more errors in the quantum computing system based at least in part on the one or more first detection events or second detection events.

16. The quantum computing system of claim 15, wherein a detection event near the center of a section is at least $$\frac{d}{2\sqrt{2}+4}$$

away from an edge of the section, where d is a length of the edge.

17. The quantum computing system of claim 15, wherein an area of the at least one first section of the first plurality of sections is based at least in part on a limit of a processing unit of the plurality of processing units.

18. The quantum computing system of claim 15, wherein the operations further comprise:
providing a third output of the qubit grid, sectioned into a third plurality of sections, to the plurality of processing units, each of the plurality of processing units associated with one of the third plurality of sections, wherein the third plurality of sections is associated with a third pattern; and
for at least one third section of the third plurality of sections matching one or more third detection events near a center of the at least one third section of the third plurality of sections with another detection event or an edge in a detection graph.

19. One or more tangible non-transitory computer-readable media storing computer-readable instructions that when executed by one or more processors cause the one or more processors to perform operations, the operations comprising:
matching data associated with one or more detection events associated with a quantum computing system using a successive pattern structure comprising a plurality of processing layers, each processing layer in the plurality of processing layers associated with a pattern including a plurality of sections, each section associated with a processing unit operable to match the one or more detection events near a center of the section;
tracking one or more errors of a quantum computing system based at least in part on a matching of the one or more detection events; wherein the one or more errors are matched with the one or more detection events;
mitigating one or more errors in the quantum computing system based at least in part on the one or more detection events.

20. A computer-implemented method for tracking one or more errors in a quantum computing system, the method comprising:
providing, by a computing system comprising one or more computing devices, a first output of a plurality of qubits to a plurality of processing units, the plurality of qubits sectioned into a first plurality of sections, each of the plurality of processing units associated with one of the first plurality of sections, wherein the first plurality of sections is associated with a first pattern;
for at least one first section of the first plurality of sections matching, by the computing system, one or more first detection events near a center of the at least one first section of the first plurality of sections with another detection event or an edge in a detection graph; and
mitigating one or more errors in the quantum computing system based at least in part on the one or more first detection events.

* * * * *